United States Patent
Nakata et al.

(10) Patent No.: US 9,741,383 B2
(45) Date of Patent: Aug. 22, 2017

(54) OPTICAL DISK RECORDING METHOD, OPTICAL DISK APPARATUS, AND OPTICAL DISK MEDIUM

(71) Applicant: Panasonic Intellectual Property Management Co., Ltd., Osaka (JP)

(72) Inventors: Kohei Nakata, Nara (JP); Yasumori Hino, Nara (JP); Harumitsu Miyashita, Nara (JP); Junichi Minamino, Nara (JP); Yoshihisa Takahashi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 95 days.

(21) Appl. No.: 14/666,488

(22) Filed: Mar. 24, 2015

(65) Prior Publication Data

US 2016/0293200 A1    Oct. 6, 2016

Related U.S. Application Data (63) Continuation of application No. PCT/JP2014/004252, filed on Aug. 20, 2014.

(30) Foreign Application Priority Data

Dec. 13, 2013    (JP) .................................. 2013-257830

(51) Int. Cl.
   *G11B 7/0045*    (2006.01)
   *G11B 7/005*    (2006.01)
   (Continued)

(52) U.S. Cl.
   CPC .......... *G11B 7/0053* (2013.01); *G11B 7/0037* (2013.01); *G11B 7/0045* (2013.01);
   (Continued)

(58) Field of Classification Search
   None
   See application file for complete search history.

(56) References Cited

U.S. PATENT DOCUMENTS

| 2001/0033543 A1 | 10/2001 | Akiyama et al. |
| 2004/0090897 A1 | 5/2004 | Akiyama et al. |
| (Continued) | | |

FOREIGN PATENT DOCUMENTS

| JP | 2002-117550 | 4/2002 |
| JP | 2003-059109 | 2/2003 |
| (Continued) | | |

OTHER PUBLICATIONS

International Search Report issued Sep. 16, 2014 in International (PCT) Application No. PCT/JP2014/004252.

*Primary Examiner* — Brian Butcher
(74) *Attorney, Agent, or Firm* — Wenderoth, Lind & Ponack, L.L.P.

(57) ABSTRACT

A track of an optical disk is formed by wobbling and divided into zones, a clock ratio of a recording clock to a wobble clock is preset for each zone, a wobble signal is detected from the optical disk, the wobble clock is generated from the wobble signal, a present position is identified by reproducing ADIP indicating a position of the track from the wobble signal and the wobble clock, the recording clock is generated with respect to the wobble clock, a data address present position is identified from the present position, a start end position of the ADIP in a recording target zone, a start end position of the data address in the recording target zone, and the clock ratio, a recording start position is identified based on the data address present position; and the data is recorded from the recording start position of the recording target zone.

11 Claims, 7 Drawing Sheets

(51) Int. Cl.
*G11B 7/007* (2006.01)
*G11B 7/0037* (2006.01)
*G11B 7/2407* (2013.01)
G11B 20/12 (2006.01)
G11B 7/24082 (2013.01)

(52) U.S. Cl.
CPC .......... *G11B 7/0079* (2013.01); *G11B 7/2407* (2013.01); *G11B 20/1217* (2013.01); *G11B 20/1252* (2013.01); *G11B 7/00718* (2013.01); *G11B 7/00736* (2013.01); *G11B 7/24082* (2013.01); *G11B 2007/00754* (2013.01); *G11B 2020/1242* (2013.01); *G11B 2020/1268* (2013.01); *G11B 2020/1277* (2013.01); *G11B 2020/1294* (2013.01)

(56) References Cited

U.S. PATENT DOCUMENTS

2007/0104058 A1* 5/2007 Horikawa .......... G11B 7/00736
369/47.53
2014/0160908 A1 6/2014 Hino et al.

FOREIGN PATENT DOCUMENTS

| | | |
|---|---|---|
| JP | 2005-050469 | 2/2005 |
| JP | 2008-287773 | 11/2008 |
| WO | 2013/140756 | 9/2013 |

* cited by examiner

OPTICAL DISK RECORDING METHOD, OPTICAL DISK APPARATUS, AND OPTICAL DISK MEDIUM

BACKGROUND OF THE INVENTION

1. Field of the Invention

The present disclosure relates to an optical disk medium in which data is optically recorded, and a recording method and an optical disk apparatus for recording and reproducing the data in and from the optical disk medium.

2. Description of the Related Art

Currently, various types of optical disks such as a DVD and a Blu-ray (registered trademark) disk (hereinafter, referred to as a BD) have been used as an information recording medium for storing a video image and data. These optical disks have higher storage reliability than a Hard Disk Drive (hereinafter, referred to as an HDD) or a magnetic tape. Therefore, usage of the optical disk is expanding from conventional storage of AV (Audio and Video) data such as a video image and a sound to long-term data storage.

However, a capacity of the data that can be stored per volume of the optical disk is about one-third of the HDD or magnetic tape. Therefore, from the viewpoint of space efficiency during storage, there is a demand for improving the capacity of the data that can be stored per volume without increasing cost of the optical disk, and research and development is actively continued. Recently, among BDs, a BDXL disk having recording density of about 33.4 GB per layer is released as an optical disk having the highest volume recording density.

Such an optical disk can store data for at least 50 years, and the optical disks have the storage reliability greater than or equal to 10 times a lifetime of about 5 years of the HDD from the viewpoint of long-term data storage. The data for the long-term storage is transferred from the HDD to the optical disk, which allows a balance between the long-term storage reliability and reduction of storage cost to be established. Particularly, compared with the HDD in which the power is consumed during data storage, in the optical disk in which no power is required during the data storage, an amount of carbon dioxide emission can be reduced as a green storage, and therefore data center power consumption that becomes a major issue can be reduced.

However, even in the BDXL disk having the highest recording density among the optical disks, the capacity of the data that can be stored per volume is about one-third of the HDD. Compared with the HDD, more storage space is required for the optical disk during the data storage. Particularly, for the usage in a data center where cost demands related to a storage space are high, there is a demand for improving the recording density per volume of the optical disk.

A land (inter-groove)-groove recording and reproducing technology of being able to improve the recording density of a track is well known as the technology of improving the recording density per volume of the optical disk. The land-groove recording and reproducing technology is already applied to DVD-RAM. In the land-groove recording and reproducing technology, the recording density of the track is improved by recording the data, which is recorded in the land or the groove in the conventional technology, in both the groove and the land.

However, in the DVD-RAM, because a data recording region and an address region are provided in the track, format efficiency is degraded to waste a region where the data is recorded. Therefore, there is disclosed a technology of recording address information by wobbling of a groove track to make good use of the data recording region (see PTL 1).

According to PTL 1, in the address information recorded by the wobbling of the groove track, an inner circumference is equal to an outer circumference in a number of pieces of address information per track, and the density of the address information per track length decreases gradually toward the outer circumference. When the data recorded in the optical disk medium having the above configuration, in order to keep the recording density constant in a recording surface of the optical disk medium, the recording surface of the optical disk medium is radially divided into a plurality of zones for managing recording. Specifically, in generating a recording clock used to record the data from a wobble signal obtained by the wobbling of the track, a frequency of the recording clock to a frequency of the wobble signal is set to a predetermined multiplying factor in accordance with a radius ratio, whereby the recording density is substantially kept constant in each zone. Therefore, although the optical disk medium has a structure in which the wobbling and the address are radially arranged, the recording density can substantially be kept constant from the inner circumference to the outer circumference by dividing the recording surface into the plurality of zones.

Figure 6:
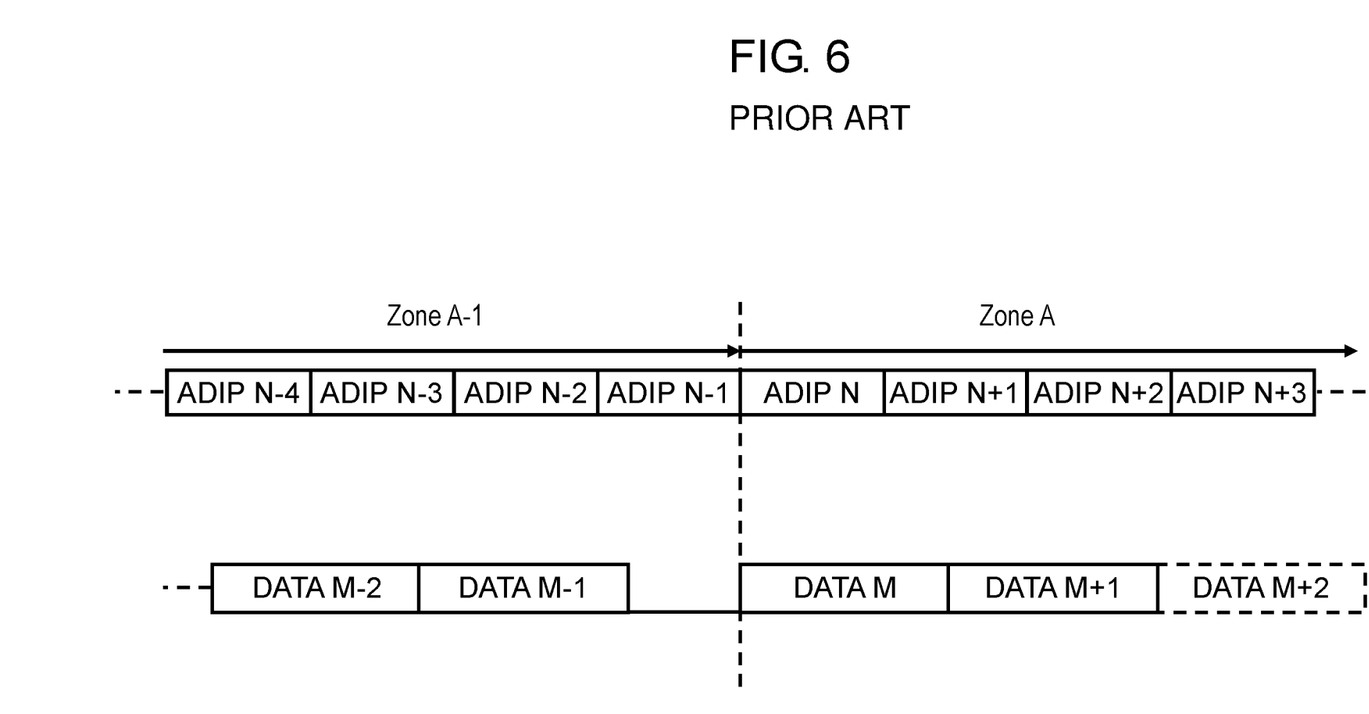
FIG. 6 is a view illustrating an arrangement structure of the data and the address with respect to a conventional optical disk medium.

FIG. 6 is a view illustrating an arrangement structure of the data and the address with respect to an optical disk medium that is the conventional technology disclosed in PTL 1. FIG. 6 illustrates the arrangement structure near a boundary of zones A−1 and A adjacent to each other. In zone A−1, a range of ADIP (ADdress In Pregroove) indicating an address expressing a position of the track arranged by wobbling is N−4, N−3, N−2, and N−1. In zone A, the range of the ADIP is N, N+1, N+2, and N+3. In the optical disk medium, a length of the ADIP is different from a length of the data to be recorded. Therefore, a one-on-one relationship does not hold between the ADIP and a data address. During continuous recording and management of the data to be recorded in any zone, a recording start position is fixed from the ADIP when the data is initially recording in any zone, and an additional recording start position is fixed from data address information on the recorded data to perform linking recording when the data is additionally recorded in the same zone. Therefore, the data can be recorded even if the length of the ADIP is different from the length of the data.

Figure 7:
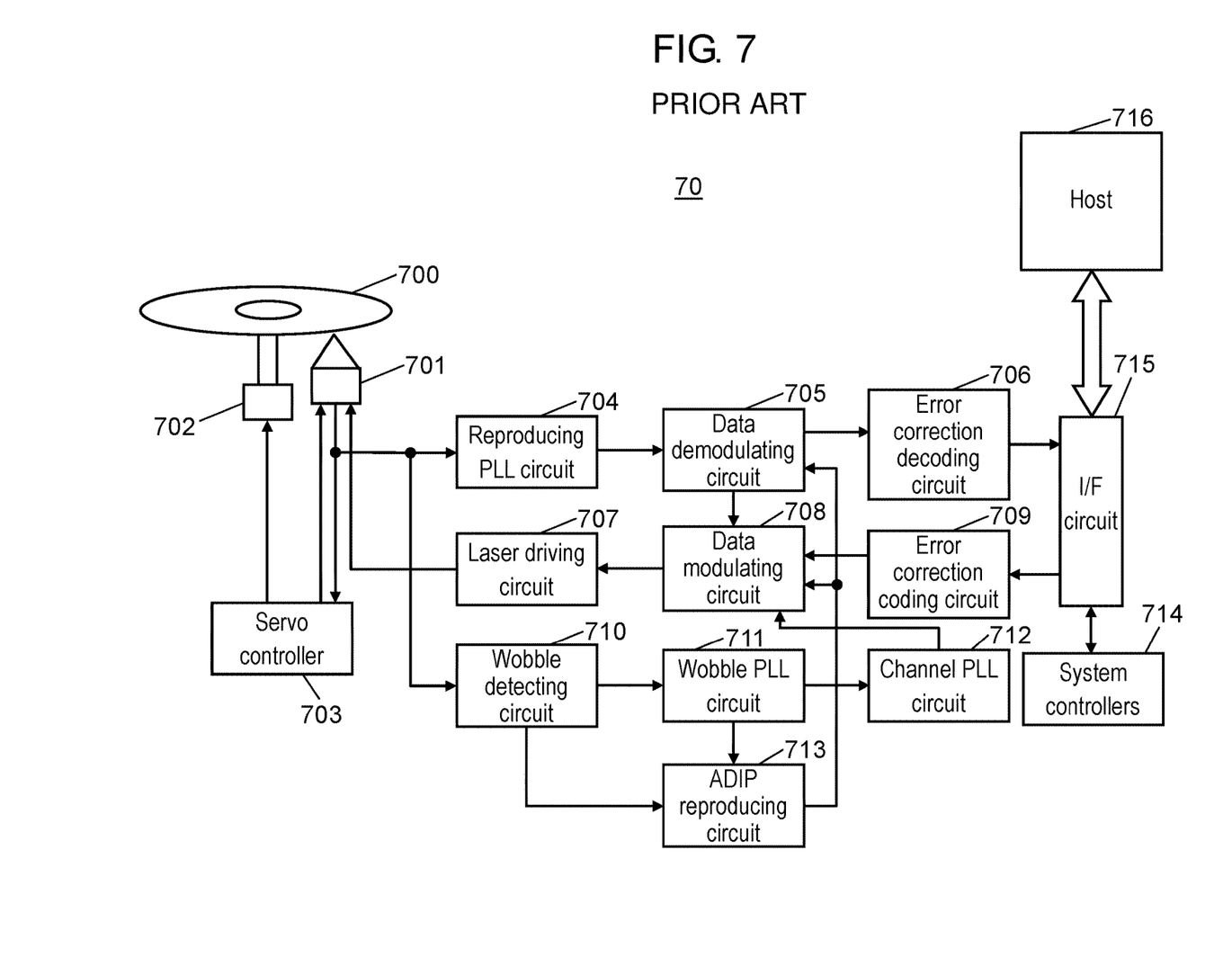
FIG. 7 is a view illustrating a configuration of the conventional optical disk apparatus.

FIG. 7 is a view illustrating a configuration of optical disk apparatus 70 in PTL 1 that is a conventional technology. Referring to FIG. 7, optical disk apparatus 70 includes optical disk medium 700, optical head 701, spindle motor 702, servo controller 703, reproducing PLL (Phase Locked Loop) circuit 704, data demodulating circuit 705, error correction decoding circuit 706, laser driving circuit 707, data modulating circuit 708, error correction coding circuit 709, wobble detecting circuit 710, wobble PLL circuit 711, channel PLL circuit 712, ADIP reproducing circuit 713, system controller 714, InterFace (I/F) circuit 715, and host 716.

Spindle motor 702 rotates optical disk medium 700. Optical head 701 records the data in optical disk medium 700, and reproduces the data from optical disk medium 700.

Servo controller 703 controls optical head 701 and spindle motor 702, performs control for focusing a light beam emitted from optical head 701 onto optical disk medium 700 and for scanning optical disk medium 700 with the light beam, and performs moving control for gaining access to the target track.

I/F circuit 715 receives recording data to be recorded in optical disk medium 700 from host 716, and transmits reproducing data reproduced from optical disk medium 700 to host 716.

Error correction coding circuit 709 adds parity for error correction to the recording data received from I/F circuit 715.

Data modulating circuit 708 modulates the recording data including the parity from the error correction coding circuit 709 in accordance with a predetermined modulation rule, and converts the recording data into a recording pattern recorded on optical disk medium 700.

In order to correctly form a mark on optical disk medium 700, laser driving circuit 707 converts the recording pattern modulated by data modulating circuit 708 into an optical pulse to drive a laser of optical head 701.

Wobble detecting circuit 710 filters and extracts a wobble signal from the reproducing signal of optical disk medium 700.

Wobble PLL circuit 711 multiplies the wobble signal at a predetermined multiplying factor to generate a wobble clock.

ADIP reproducing circuit 713 reproduces ADIP information from the wobble signal and the wobble clock.

Channel PLL circuit 712 is operated such that a phase of a clock in which the wobble clock is divided by m is synchronized with a phase of a clock in which the recording clock is divided by n, and channel PLL circuit 712 generates the recording clock having an n/m frequency.

Reproducing PLL circuit 704 extracts a synchronization clock for demodulating the reproducing signal from optical disk medium 700.

Data demodulating circuit 705 demodulates the recorded data from the reproducing signal.

Error correction decoding circuit 706 corrects an error of the demodulated data and restores.

System controller 714 controls each block, and also controls communication with host 716. System controller 714 controls each unit of optical disk apparatus 70 such that the data is recorded based on the recording clock generated by channel PLL circuit 712. Data modulating circuit 708, laser driving circuit 707, and optical head 701 record the data based on the recording clock.

A recording operation of optical disk apparatus 70 will be described below. I/F circuit 715 acquires the recording data transmitted from host 716. Error correction coding circuit 709 adds a parity code for correcting the error during the reproducing, to the recording data transferred through I/F circuit 715. For example, data modulating circuit 708 modulates the recording data to which the parity code is added to the recording pattern in accordance with a modulation rule of a 1-7 PP code that is one of run-length limited codes. Laser driving circuit 707 converts the recording pattern, which is modulated to a recording mark and a space of 2 T to 9 T by the 1-7 PP code, into a castle type pulse waveform in order to correctly form the recording mark on optical disk medium 700, and laser driving circuit 707 outputs to optical head 701 a driving signal for driving the laser. Optical head 701 irradiates optical disk medium 700 with a laser pulse to record the recording pattern.

Optical disk medium 700 has a structure in which the ADIP is radially provided. Therefore, the recording clock used to record the data is controlled such that line density of the recording data is substantially kept constant in the recording surface of optical disk medium 700. Channel PLL circuit 712 controls the recording clock. Wobble detecting circuit 710 detects a wobble signal corresponding to the wobbling of the track. Based on the wobble signal, wobble PLL circuit 711 generates the wobble clock synchronized with the wobble signal. Channel PLL circuit 712 is operated such that a phase of a clock in which the wobble clock is divided by m is synchronized with a phase of a clock in which the recording clock is divided by n, and channel PLL circuit 712 generates the recording clock having the n/m frequency of the wobble clock.

The recording surface of optical disk medium 700 is radially divided into the plurality of zones. In each of the plurality of zones, the frequency of the recording clock or the recording density is changed. At a starting position of each of the plurality of zones, system controller 714 fits the recording start position of the recording pattern recorded in optical disk medium 700 to a boundary of the ADIP. In additionally recording the recording pattern in the zone, data demodulating circuit 705 demodulates the already-recorded recording pattern, and detects a synchronization mark and the data address, which are included in the recording pattern, to identify the position to an accuracy of 1T. Based on the position identified by data demodulating circuit 705, the recording pattern to be newly recorded is recorded so as to be continuous with a terminal position of the already-recorded recording pattern. The continuous writing of the data enables the recording data in the zone to be reproduced without interruption while the data address is detected to confirm continuousness.

In a neighborhood of the boundary of zones A−1 and A in FIG. 6, the recording pattern is continuously recorded in data addresses M−2 and M−1 in zone A−1. At the starting position of zone A, the boundary of ADIP N is coincides with the boundary of data address M of the recording pattern, and the recording pattern is continuously recorded in data address M+1. In the case that the further recording pattern is newly recorded, the recording pattern is continuously recorded in data address M+2.

According to the conventional method in FIG. 6, the data can be recorded in the same optical disk medium while the data line density is changed. For example, the data can be recorded in the optical disk with the same line density as BDXL, the data can be recorded in the optical disk at 1.2 times the data line density of BDXL, and the data can be recorded in the optical disk at twice the data line density of BDXL. Therefore, a capacity of the optical disk medium can be increased only by a technology of processing the recording and reproducing signals without changing the substantial structure of optical disk medium, and the storage cost can be reduced.

CITATION LIST

Patent Literature

PTL 1: International Patent Publication No. 2013/140756

SUMMARY OF THE INVENTION

An optical disk recording method of the present disclosure is for dividing data into units of predetermined blocks and recording the data in an optical disk medium. The optical disk medium including a track in which the data is recorded, the track is formed by wobbling and radially divided into a plurality of zones, and a clock ratio n/m (n and m are natural numbers of 1 or more) of a recording clock to a wobble clock is preset for each of the plurality of zones. The optical disk recording method includes detecting a wobble signal corresponding to the wobbling from the optical disk medium; generating a wobble clock by multiplying the wobble signal by a predetermined multiplying factor; identifying a present position by reproducing ADIP indicating a position of the track from the wobble signal and the wobble clock; generating a recording clock having the clock ratio n/m to the wobble clock; identifying a data address present position from the present position, a start end position of the ADIP in a recording target zone, a start end position of the data address in the recording target zone, and the clock ratio n/m, and identifying a recording start position based on the data address present position; and recording the data from the recording start position in the recording target zone.

According to the present disclosure, the present position of the data address can be identified from the ADIP present position irrespective of the data line density, so that the track density and the line density can be increased without degrading the access capability.

DETAILED DESCRIPTION OF THE PREFERRED EMBODIMENT

Hereinafter, an exemplary embodiment will be described in detail with reference to the drawings. However, the detailed description beyond necessity is occasionally omitted. For example, the detailed description of the well-known matter or the overlapping description of the substantially same configuration is occasionally omitted. This is because unnecessary redundancy of the following description is avoided for the purpose of the easy understanding of those skilled in the art.

The accompanying drawings and the following description are provided in order that those skilled in the art sufficiently understand the present disclosure, and the claims are not limited to the accompanying drawings and the following description.

A problem of the optical disk apparatus disclosed in PTL 1 that is of the conventional technology will be described below. In order to correctly identify the position where the data is recorded and reproduced, it is necessary to reproduce the data address information and synchronization mark, which are included in an already-recorded data block, to detect a synchronization position with an accuracy of one channel bit. When the data line density does not exceed about 1.2 times the BDXL, the data address and the synchronization mark can stably be detected. However, when the data line density further increases, an SNR (Signal-Noise Ratio) of the reproducing signal decreases, and it is gradually difficult that a bit of 1 or 0 of the data is decoded from a reproducing signal to detect the data address and the synchronization mark. The stability of the identification of the synchronization position with the accuracy of one channel bit degrades, which results in a new problem in that access time necessary for the recording and reproducing of the data lengthens or the recording position deviates by at least one channel bit.

When a zone boundary is stridden during a search of a target access position, the data address, which is followed while reproduced, is temporarily interrupted, and it is necessary to perform data address tracking processing again after a condition is changed to one matched with a start end position of the next zone, which generates the wasted access time.

The present disclosure is made for solving the problem and an object of the present disclosure is to provide an optical disk recording method, an optical disk apparatus, and an optical disk medium, for being able to increasing both the track density and the line density without decreasing the access capability during the recording and reproducing of the data and for increasing the recording density per volume of the optical disk medium.

Exemplary Embodiment

Figure 1:
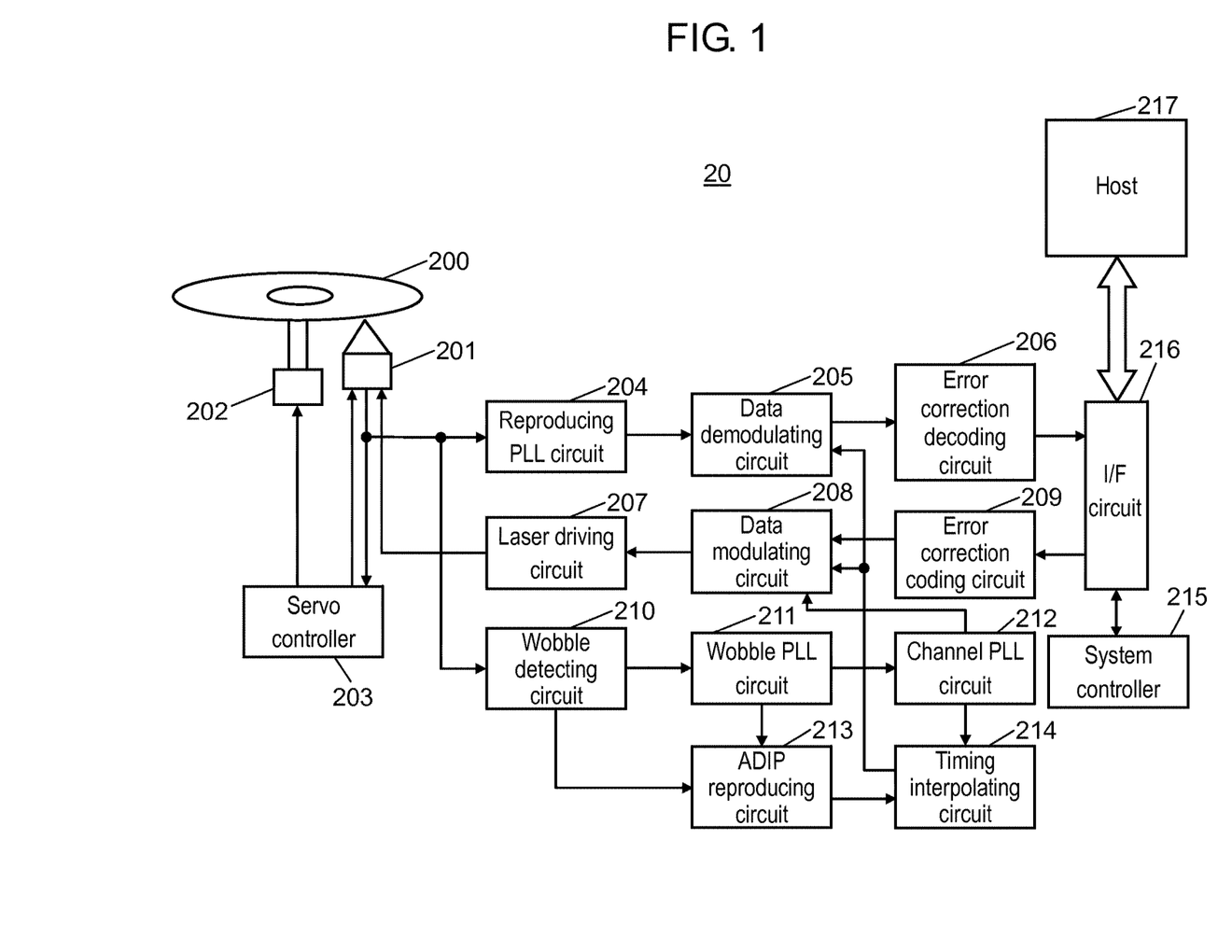
FIG. 1 is a view illustrating a configuration of an optical disk apparatus according to an exemplary embodiment.

FIG. 1 is a view illustrating a configuration of optical disk apparatus 20 according to an exemplary embodiment. Optical disk apparatus 20 in FIG. 1 includes optical head 201, spindle motor 202, servo controller 203, reproducing PLL circuit 204, data demodulating circuit 205, error correction decoding circuit 206, laser driving circuit 207, data modulating circuit 208, error correction coding circuit 209, wobble detecting circuit 210, wobble PLL circuit 211, channel PLL circuit 212, ADIP reproducing circuit 213, timing interpolating circuit 214, system controller 215, I/F circuit 216, and host 217.

Spindle motor 202 rotates optical disk medium 200. Optical head 201 records the data in optical disk medium 200, and reproduces the data from optical disk medium 200.

Servo controller 203 controls optical head 201 and spindle motor 202, performs control for focusing a light beam emitted from optical head 201 onto optical disk medium 200 and for scanning optical disk medium 200 with the light beam, and performs moving control for gaining access to the target track.

I/F circuit 216 receives recording data to be recorded in optical disk medium 200 from host 217, and transmits reproducing data reproduced from optical disk medium 200 to host 217.

Error correction coding circuit 209 adds parity for error correction to the recording data received from I/F circuit 216.

Data modulating circuit 208 modulates the recording data including the parity from the error correction coding circuit 209 in accordance with a predetermined modulation rule, and converts the recording data into a recording pattern recorded on optical disk medium 200.

In order to correctly form a mark on optical disk medium 200, laser driving circuit 207 converts the recording pattern modulated by data modulating circuit 208 into an optical pulse to drive a laser of optical head 201.

Wobble detecting circuit 210 extracts a wobble signal from the reproducing signal of optical disk medium 200.

Wobble PLL circuit 211 multiplies the wobble signal at a predetermined multiplying factor to generate a wobble clock.

ADIP reproducing circuit 213 reproduces ADIP information from the wobble signal and the wobble clock.

Channel PLL circuit 212 is operated such that a phase of a clock in which the wobble clock is divided by m is synchronized with a phase of a clock in which the recording clock is divided by n, and channel PLL circuit 212 generates the recording clock having an n/m frequency.

Timing interpolating circuit 214 identifies a position where the recording data is recorded from the ADIP and the value of n/m.

Reproducing PLL circuit 204 extracts a synchronization clock for demodulating the reproducing signal from optical disk medium 200.

Data demodulating circuit 205 demodulates the recorded data from the reproducing signal.

Error correction decoding circuit 206 corrects an error of the demodulated data and restores.

System controller 215 controls each block, and also controls communication with host 217. System controller 215 controls each unit of optical disk apparatus 20 such that the data is recorded based on the recording clock generated by channel PLL circuit 212 and the recording position identified by timing interpolating circuit 214. Data modulating circuit 208, laser driving circuit 207, and optical head 201 record the data based on the recording clock and the recording position.

At this point, data modulating circuit 208, laser driving circuit 207, and optical head 201 are collectively referred to as a recording unit.

Figure 2:
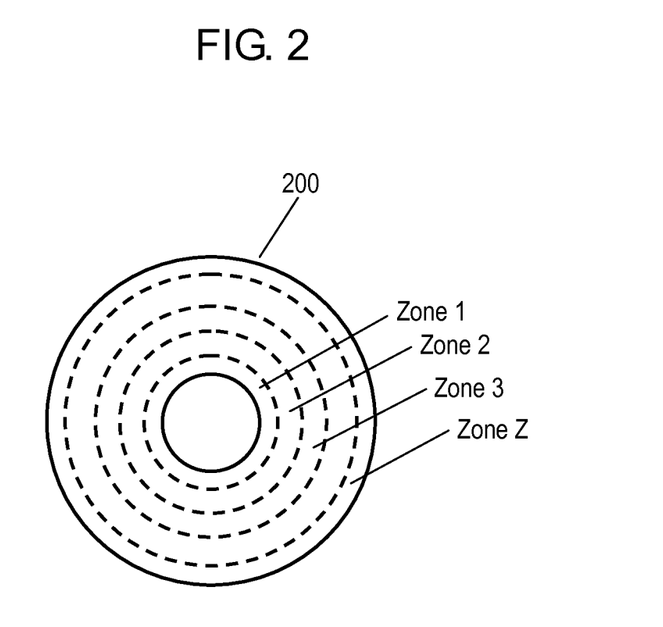
FIG. 2 is a view illustrating a zone of an optical disk medium of the exemplary embodiment.

FIG. 2 is a view illustrating the zone of optical disk medium 200 of the exemplary embodiment. The recording surface of optical disk medium 200 is radially divided into Z (Z is a natural number of 2 or more) zones. In each of the plurality of zones, the frequency of the recording clock or the recording density is changed. The wobbling of the track is radially formed, and a length of the wobbling increases gradually toward the outer circumference. When the data is recorded in the whole surface by being synchronized with the wobbling, the line density decreases toward the outer circumference, and the recording capacity decreases. Therefore, the line density can substantially be kept constant in the whole surface by changing a ratio of a data unit length to a wobbling length in accordance with a radius. The track is constituted by a groove track formed of the groove and the land track formed between groove tracks adjacent to each other. The data can be recorded in both the groove track and the land track.

A recording operation of optical disk apparatus 20 of the exemplary embodiment will be described below.

I/F circuit 216 acquires the recording data transmitted from host 217. The recording data is divided into blocks of predetermined units, and is transmitted to error correction coding circuit 209 in each block. Error correction coding circuit 209 adds a parity code for correcting the error during the reproducing, to the recording data of the block unit. For example, data modulating circuit 208 modulates the recording data to which the parity code is added to the recording pattern in accordance with the modulation rule of the 1-7 PP code. Laser driving circuit 207 converts the recording pattern, which is modulated to a recording mark and a space of 2 T to 9 T by the 1-7 PP code, into a castle type pulse waveform in order to correctly form the recording mark on optical disk medium 200, and laser driving circuit 207 outputs a driving signal to optical head 201 in order to drive the laser. Optical head 201 irradiates optical disk medium 200 with a laser pulse to record the recording pattern.

Optical disk medium 200 has a structure in which the ADIP is radially provided. Therefore, the recording clock used to record the data is controlled such that line density of the recording data is substantially kept constant in the recording surface of optical disk medium 200. Channel PLL circuit 212 controls the recording clock. Wobble detecting circuit 210 detects a wobble signal corresponding to the wobbling of the track. Based on the wobble signal, wobble PLL circuit 211 generates the wobble clock synchronized with the wobble signal. Channel PLL circuit 212 is operated such that a phase of a clock in which the wobble clock is divided by m is synchronized with a phase of a clock in which the recording clock is divided by n, and channel PLL circuit 212 generates the recording clock having the n/m frequency of the wobble clock.

Figure 3:
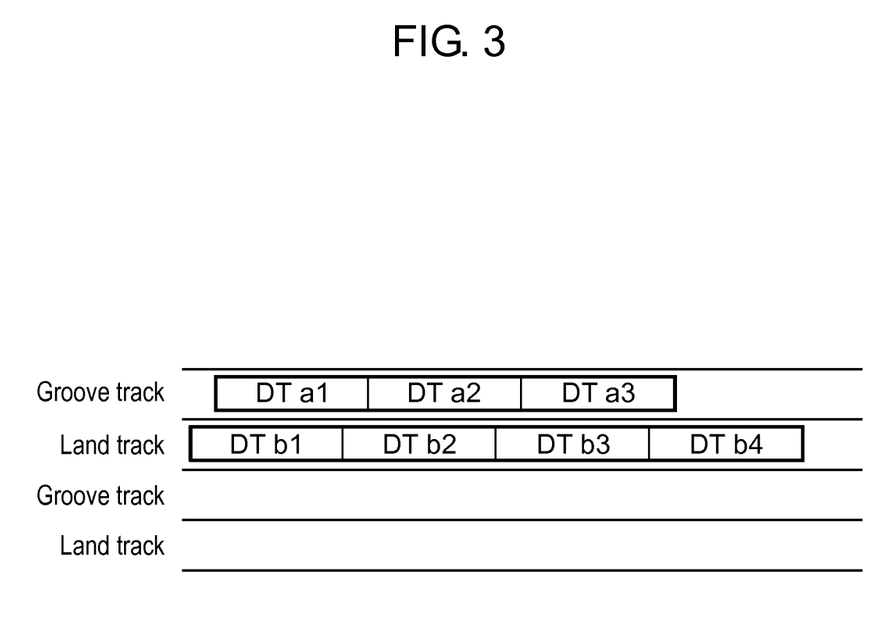
FIG. 3 is a view illustrating a state in which a plurality of blocks are recorded in the optical disk medium of the exemplary embodiment.

System controller 215 controls the above recording operation. System controller 215 fixes the track in which the recording data acquired by I/F circuit 216 is recorded. The recording data is divided in units of blocks, the plurality of blocks concerning one piece of recording data is continuously recorded in one of the groove track and land track of the same layer. FIG. 3 is a view illustrating a state in which the plurality of blocks are recorded in optical disk medium 200 of the exemplary embodiment. Data a is divided into three, and continuously recorded in the groove track as DTa1, DTa2, and DTa3. Data b is divided into four, and continuously recorded in the land track as DTb1, DTb2, DTb3, and DTb4. Thus, since the data is collectively recorded in the same track of the same layer, the position of optical head 201 is less moved in playing back the recording data, and the recording data can be read in a short time. For example, in data a, DTa1 and DTa2 are not continuously recorded in the groove track, but DTa1 is recorded in the groove track while DTa2 is recorded in the land track or recorded in the groove track located at a radial position distant from DTa1. In this case, in reproducing data a, in order to reproduce DTa2 after reproducing DTa1, it is necessary to move optical head 201 to the land track or the groove track located at the radial position distant from DTa1. Therefore, the whole data a is not assembled until DTa2 is acquired, and the reproducing time is lengthened.

Then system controller 215 fixes the zone in which the recording data is recorded.

Figure 4:
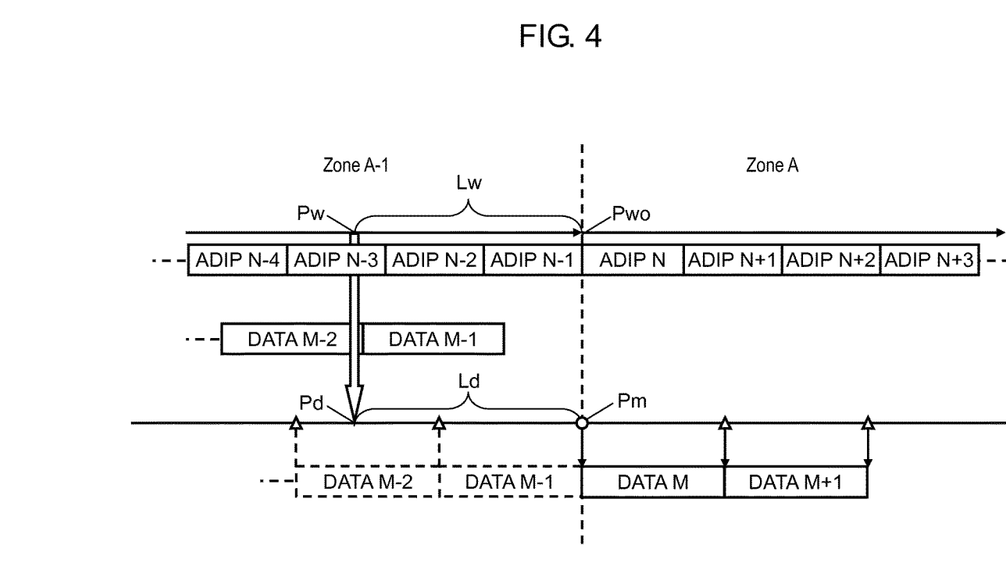
FIG. 4 is a view illustrating an arrangement structure of data and an address with respect to the optical disk medium of the exemplary embodiment.

FIG. 4 is a view illustrating an arrangement structure of the data and the address with respect to optical disk medium 200 of the exemplary embodiment. FIG. 4 illustrates an arrangement structure near a boundary of zones A−1 and A adjacent to each other. In zone A−1, a range of ADIP arranged by the wobbling is N−4, N−3, N−2, and N−1. In zone A, the range of the ADIP is N, N+1, N+2, and N+3.

In FIG. 4, the recording pattern is continuously recorded in data addresses M−1 and M−2 surrounded by the solid line in zone A−1. At the starting position of zone A, the boundary of ADIP N is coincides with the boundary of data address M of the recording pattern, and the recording pattern is continuously recorded in data address M+1.

The recording start position of each zone is caused to coincide with the boundary position of the ADIP. Different values of n/m are allocated to zones A−1 and A, but the zone length does not always become integral multiple of the data block length. Accordingly, as illustrated in FIG. 4, the region where the data is not recorded remains from a termination of final data block M−1 of zone A−1 to a start end of zone A.

The case that data block M+2 is recorded next to data block M+1 in zone A will be described below. The position irradiated with the laser beam by optical head 201 is moved in front of the recording target position. Using wobble detecting circuit 210, wobble PLL circuit 211, and ADIP reproducing circuit 213, the ADIP is reproduced to physically identify the present position. When the start end of zone A is set to reference position Pwo, timing interpolating circuit 214 calculates distance Lw from reference position Pwo to present position Pw based on a wobbling period. Distance Lw is obtained from Lw=Pw−Pwo.

Calculated distance Lw is converted based on the length of the recording data block to calculate distance Ld. Distance Ld based on units of recording data blocks is obtained from Ld=Lw×n/m. Data block M is located at a head of zone A, present position Pd based on units of data blocks is obtained from Pd=Pm+Ld with start end position Pm of zone A as a base point.

Similarly, in data blocks M−2 and M−1 recorded in zone A−1, the position based on units of data blocks can be calculated with start end position Pm of zone A as the base point. Data blocks M−2 and M−1 surrounded by a broken line indicate virtual positions when start end position Pm of zone A is set to the base point. Assume that the access target position is located in zone A while the present position is located in zone A−1 and the zone boundary is strode. Even in this case, the data address is not interrupted because virtual present position Pd is used.

Thus, using the ADIP only, present position Pd based on units of data blocks can be obtained with the start end of zone A as the reference position even if the present position is located in zone A−1.

Channel PLL circuit 212 is operated such that the phase of the clock in which the wobble clock is divided by m is synchronized with the phase of the clock in which the recording clock is divided by n, using the value of n/m fixed in zone A, and channel PLL circuit 212 generates the recording clock having the n/m frequency of the wobble clock.

Based on identified present position Pd based on units of data blocks, timing interpolating circuit 214 can operate a data timing interpolating counter at the generated recording clock to interpolate the boundary of the subsequent data block with an accuracy of one channel bit. When the data timing interpolating counter indicates the target position where the data is recorded, data modulating circuit 208 and laser driving circuit 207 operate to start the recording of the data.

Figure 5:
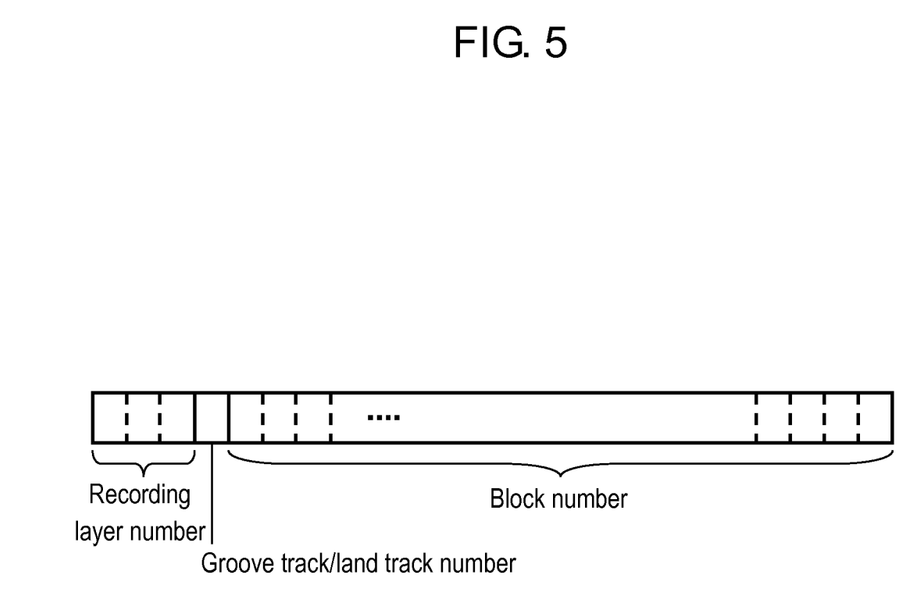
FIG. 5 is a view illustrating a configuration of a data address of the exemplary embodiment.

In the recording data, a data address is added to each data block. FIG. 5 is a view illustrating a configuration of the data address of the exemplary embodiment. The data address is constituted by a recording layer number, a block number, and groove track/land track information. The recording layer number is information indicating a number of a recording layer in which the data is recorded, the block number is information indicating a data block number, and groove track/land track information indicates whether the data is recorded in the land track or the groove track.

In the case that data block M+2 is recorded, the data block number becomes M+2. The recording data to which the data address is added is modulated by data modulating circuit 208, and recorded in the track of optical disk medium 200 by laser driving circuit 207 and optical head 201.

Present position Pd based on units of data blocks can be settled once since the track is scanned, and then present position Pd based on units of data blocks can be used to determine whether the data timing interpolating counter is shifted. The present position based on units of data blocks is obtained in each unit of ADIP, and the obtained position information is compared to the value of the data timing interpolating counter to check whether the synchronization position where the data is recorded deviates from the ADIP.

When the recording data is continuously recorded, a trouble is not generated in reproducing the recording data because of the continuous recording data. However, when the data is additionally recorded in the subsequent position after the recording is ended, the terminal position does not coincide with the start end position, but an unrecorded gap or overwriting is generated. The unrecorded gap and the overwriting do not cause a large error when a deviation amount is less than or equal to about 10 T. However, when the deviation amount increases, synchronization timing of demodulating the data is not matched to generate a burst error larger than the deviation amount of the recording position. In the worst case, the error can hardly be corrected by error correction decoding circuit 206. Accordingly, it is desirable that the deviation amount be constantly checked so as not to increase. The deviation amount is fed back to channel PLL circuit 212 so as not to increase, and the frequency of the recording clock is temporarily set slightly higher or lower, and the correction may be performed such that the deviation amount comes close to zero.

The recording operation performed by optical disk apparatus 20 of the exemplary embodiment of the present disclosure has been described above, and the same holds true for a reproducing operation. Reproducing PLL circuit 204, data demodulating circuit 205, and error correction decoding circuit 206 operate to reproduce the data at the position of the data block to be reproduced in accordance with the data timing interpolating counter of timing interpolating circuit 214.

At this point, a table of start end ADIP reference position Pwo of each zone, start end data block reference position Pm of each zone, and the ratio n/m of the wobble clock and recording clock of each zone are constructed as management information on optical disk medium 200. The management information is recorded in one predetermined zone of optical disk medium 200. System controller 215 controls each block so as to read the management information, and performs the recording operation in accordance with the read management information.

Instead of the management information, line density information indicating the data line density may be recorded in a predetermined zone. In this case, system controller 215 controls each block so as to read the line density information, generates a table of the management information corresponding to the read line density information, and performs the recording operation in accordance with the read management information. The management information or the line density information may be recorded as the data, or recorded by the wobbling similarly to the ADIP. In the case that the management information or the line density information is recorded as the data, the management information or the line density information is reproduced as the data by reproducing PLL circuit 204, data demodulating circuit 205, and error correction decoding circuit 206. In the case that the management information or the line density information is recorded by the wobbling, the management information or the line density information is reproduced by wobble detecting circuit 210, wobble PLL 211, and ADIP reproducing circuit 213.

As described above, the information indicating where the data is recorded in the optical disk medium 200 is not lost by recording the management information or the line density information at a predetermined position of the optical disk medium.

According to the optical disk apparatus of the exemplary embodiment of the present disclosure, because the position can stably be identified only from the ADIP irrespective of the data line density, the effect that the limitation to the improvement of the data line density is eliminated can be obtained.

Additionally, according to the optical disk apparatus of the exemplary embodiment of the present disclosure, the virtually continuous data address is extracted from not the data address included in the recorded data but the start end position of the access target zone and the ADIP. Therefore, the tracking of the data address is not interrupted at the zone boundary, and the access time is not lengthened.

What is claimed is:

1. An optical disk recording method for dividing data into units of predetermined blocks and recording the data in an optical disk medium,
   the optical disk medium including a track in which the data is recorded, the track being formed by wobbling and radially divided into a plurality of zones, and a clock ratio n/m (n and m are natural numbers of 1 or more) of a recording clock to a wobble clock being preset for each of the plurality of zones,
   the optical disk recording method comprising:
   detecting a wobble signal corresponding to the wobbling from the optical disk medium;
   generating a wobble clock by multiplying the wobble signal by a predetermined multiplying factor;
   identifying a present position by reproducing ADIP (ADdress in Pregroove) indicating a position of the track from the wobble signal and the wobble clock;
   generating a recording clock having the clock ratio n/m to the wobble clock;
   identifying a data address present position located in a zone different from a recording target zone, from the present position located in the zone different from the recording target zone, a start end position of the ADIP in the recording target zone, a start end position of the data address in the recording target zone, and the clock ratio n/m, and identifying a recording start position based on the data address present position; and
   recording the data from the recording start position in the recording target zone.

2. The optical disk recording method according to claim 1, wherein
   the optical disk medium stores the start end position of the ADIP, the start end position of the data address, and the clock ratio n/m for each of the plurality of zones, as management information and
   the management information is recorded in a predetermined zone.

3. The optical disk recording method according to claim 1, wherein
   the optical disk medium stores line density information indicating line density at which the data is recorded, and
   the optical disk recording method further comprises calculating the start end position of the ADIP, the start end position of the data address, and the clock ratio n/m for each of the plurality of zones.

4. The optical disk recording method according to claim 1, wherein
   the optical disk medium includes a plurality of recording layers, each of the recording layers including a groove track formed of a groove and a land track formed between groove tracks adjacent to each other, and
   in the recording, continuous data is recorded continuously in one of the groove track of an identical layer and the land track of the identical layer.

5. The optical disk recording method according to claim 4, wherein the data address includes information that is the recording layer in which the data is recorded and the groove track or the land track in which the data is recorded and information that identifies a block number of the data to be recorded.

6. An optical disk apparatus that divides data into units of predetermined blocks and records the data in an optical disk medium,
   the optical disk medium including a track in which the data is recorded, the track being formed by wobbling and radially divided into a plurality of zones, and a clock ratio n/m (n and m are natural numbers of 1 or more) of a recording clock to a wobble clock being preset for each of the plurality of zones,
   the optical disk apparatus comprising:
   a wobble detecting circuit that detects a wobble signal corresponding to the wobbling from the optical disk medium;
   a wobble PLL (Phase Locked Loop) circuit that generates the wobble clock in which the wobble signal is multiplied by a predetermined multiplying factor;
   an ADIP (ADdress in Pregroove) reproducing circuit that identifies a present position by reproducing ADIP indicating a position of the track from the wobble signal and the wobble clock;
   a channel PLL circuit that generates the recording clock having the clock ratio n/m to the wobble clock;
   a timing interpolating circuit that identifies a data address present position located in a zone different from a recording target zone, from the present position located in the zone different from the recording target zone, a start end position of the ADIP in the recording target zone, a start end position of the data address in the recording target zone, and the clock ratio n/m, and identifies a recording start position based on the data address present position; and
   a recording unit that records the data from the recording start position in the recording target zone.

7. An optical disk medium, wherein
   a track in which data is recorded in units of predetermined blocks is formed by wobbling and radially divided into a plurality of zones, and
   a start end position of ADIP (ADdress in Pregroove) indicating a position of the track, a start end position of a data address, and a clock ratio n/m (n and m are natural numbers of 1 or more) of a recording clock to a wobble clock are stored as management information for each of the plurality of zones.

8. The optical disk medium according to claim 7, comprising a plurality of recording layers,
   wherein each of the recording layers includes a groove track formed of a groove and a land track formed between groove tracks adjacent to each other.

9. The optical disk medium according to claim 8, wherein the data address includes information that is the recording layer in which the data is recorded, information that identifies whether the track in which the data is recorded is the groove track or the land track, and information indicating a position of one of the predetermined blocks.

10. The optical disk medium according to claim 7, wherein line density information indicating line density of the recorded data is recorded.

11. The optical disk medium according to claim 7, wherein the management information is recorded in a predetermined zone.

\* \* \* \* \*